US005769355A

United States Patent [19]
Guttin

[11] Patent Number: 5,769,355
[45] Date of Patent: Jun. 23, 1998

[54] ROCKER BEARING DEVICE DESIGNATED TO CARRY ONE END OF A WINDING BAR

[75] Inventor: Christian Guttin, Les Abrets, France

[73] Assignee: Guttin Christian Sàrl, France

[21] Appl. No.: 792,448

[22] Filed: Jan. 31, 1997

[30] Foreign Application Priority Data

Jan. 31, 1996 [FR] France .................................. 96 01329

[51] Int. Cl.$^6$ .................................................. B65H 16/06
[52] U.S. Cl. ..................................... 242/598.4; 242/129.6; 242/129.62; 403/325; 403/383
[58] Field of Search .............................. 242/598.4, 129.6, 242/129.62; 403/383, 321, 325

[56] References Cited

U.S. PATENT DOCUMENTS

| 3,147,985 | 9/1964 | Honberger et al. | 242/598.4 |
|---|---|---|---|
| 3,552,101 | 1/1971 | Papp | 242/598.4 |
| 3,606,407 | 9/1971 | Pendergast | 242/598.4 |
| 4,887,926 | 12/1989 | Kunz | 403/27 |
| 5,141,355 | 8/1992 | Stillwagon | 403/383 |
| 5,314,053 | 5/1994 | Nishmura | 403/383 |

FOREIGN PATENT DOCUMENTS

| 611715 | 8/1994 | European Pat. Off. . |
|---|---|---|
| 3127553 | 7/1981 | Germany . |

OTHER PUBLICATIONS

French Search Report dated Oct. 25, 1996 for French application No. FR 9601329.

*Primary Examiner*—William Stryjewski
*Attorney, Agent, or Firm*—Young & Basile, P.C.

[57] ABSTRACT

A rocker bearing device designed to carry one coupling end of a winding rod. The device contains a rotatable drive spindle. A flywheel is pivotal on the front end of the drive spindle for covering the end of the winding rod. The winding rod rests in a seat furnished in a wear piece. A covering piece is mobile in a pivoting manner around a transversal shaft and is brought back towards the rear by a spring which, at the time of the rocking towards the front of the flywheel, is driven by the flywheel so that one of the parts comes into contact with the end of the winding rod which rests in the hollow cavity of the wear piece by passing above a centering disk that coaxially contains the end of the winding rod.

3 Claims, 2 Drawing Sheets

ROCKER BEARING DEVICE DESIGNATED TO CARRY ONE END OF A WINDING BAR

BACKGROUND OF THE INVENTION

This invention relates to a rocker bearing device designed to carry one of the ends of a winding rod, for the rolling and unrolling of sheets of material, and including a seat blockable by the swinging of a flywheel.

One already knows of such bearings, which contain generally a mobile shaft rotating in a fixed body, of which one end is joined to a motor system and the other end comprises a seat, generally furnished with a wear piece and a flywheel able to be swung around a axis perpendicular to the axis of rotation and capable of covering the end of a generally square section of the winding rod deposited in the seat with the goal of locking the seat. In use, the end of the winding rod is placed in the seat, and the flywheel is rocked manually or automatically by rotation movement.

When the winding, or the unwinding, must be carried out at great speeds, it is necessary that the holding and the centering of the winding rod be carried out very precisely in order to avoid, notably, clearance which can lead to a premature wear and tear of the holding parts.

Therefore, rocker bearing devices where the centering and the holding are carried out before the rocking of the flywheel have been proposed, the rocker of the flywheel serving only to secure the holding parts. These devices include notably, a piece mobile around an axis parallel to the shaft or spindle which closely covers the coupling lug, the rocking of the flywheel permitting coverage of the mobile piece.

These devices have, however, the inconvenience of not permitting automatic locking at the time of putting in rotation, since it necessitates a manual intervention to rock the mobile piece.

In addition, these devices do not permit an adjustment of the mobile piece on the coupling lug according to the distortions or wear and tear of the coupling lug.

The present invention has an aim to remedy these inconveniences by proposing a rocker bearing designed to be used at great speed, permitting, in addition to a perfect holding of the winding rod, an automatic locking without manual intervention.

SUMMARY OF THE INVENTION

The device which meets the object of this invention is characterized essentially on one hand by the end of the winding rod being equipped with a coupling lug with a non-round section and, at its end, being equipped with a disk coaxial to the rod, and, on the other hand, by a hollow impression cavity of the wear piece including a drive part in a form complementary to that of the coupling lug and a semi-circular part designed to house a part of the covering disk; and, also, on the other hand, by the front end of the drive spindle consisting of a covering piece mobile in rotation around a transversal shaft, and pulled back towards the rear by a spring, which, at the time of the rocking towards the front of the flywheel, is dragged by it to come into contact with the coupling lug, passing above the disk, the upper part of which closely lodges itself in a groove of the covering piece, the bottom of the groove being curved for this purpose in order to take the shape of the disk.

According to an additional characteristic of the device according to the invention, the flywheel contains at least one threaded bore opening in front of the covering piece when the flywheel is rocked towards the front, and in which is screwed a screw, the end of which consists of a bronze pin designed to come into contact with the covering piece in order to assure the adjustment of the latter on the end of winding rod.

According to another additional characteristic of the device of the invention, the flywheel includes a bore opening in front of the covering piece when the flywheel is rocked towards the front, and into which is introduced a ball designed to come into contact with the covering piece and maintained by a spring itself held by a screw screwed in the bore.

BRIEF DESCRIPTION OF THE DRAWING

The advantages and the characteristics of the present invention will become more clear from the description which follows and which relates to the attached drawing, which represents in a non-limiting manner an embodiment thereof in which.

DESCRIPTION OF THE PREFERRED EMBODIMENT

Figure 1:
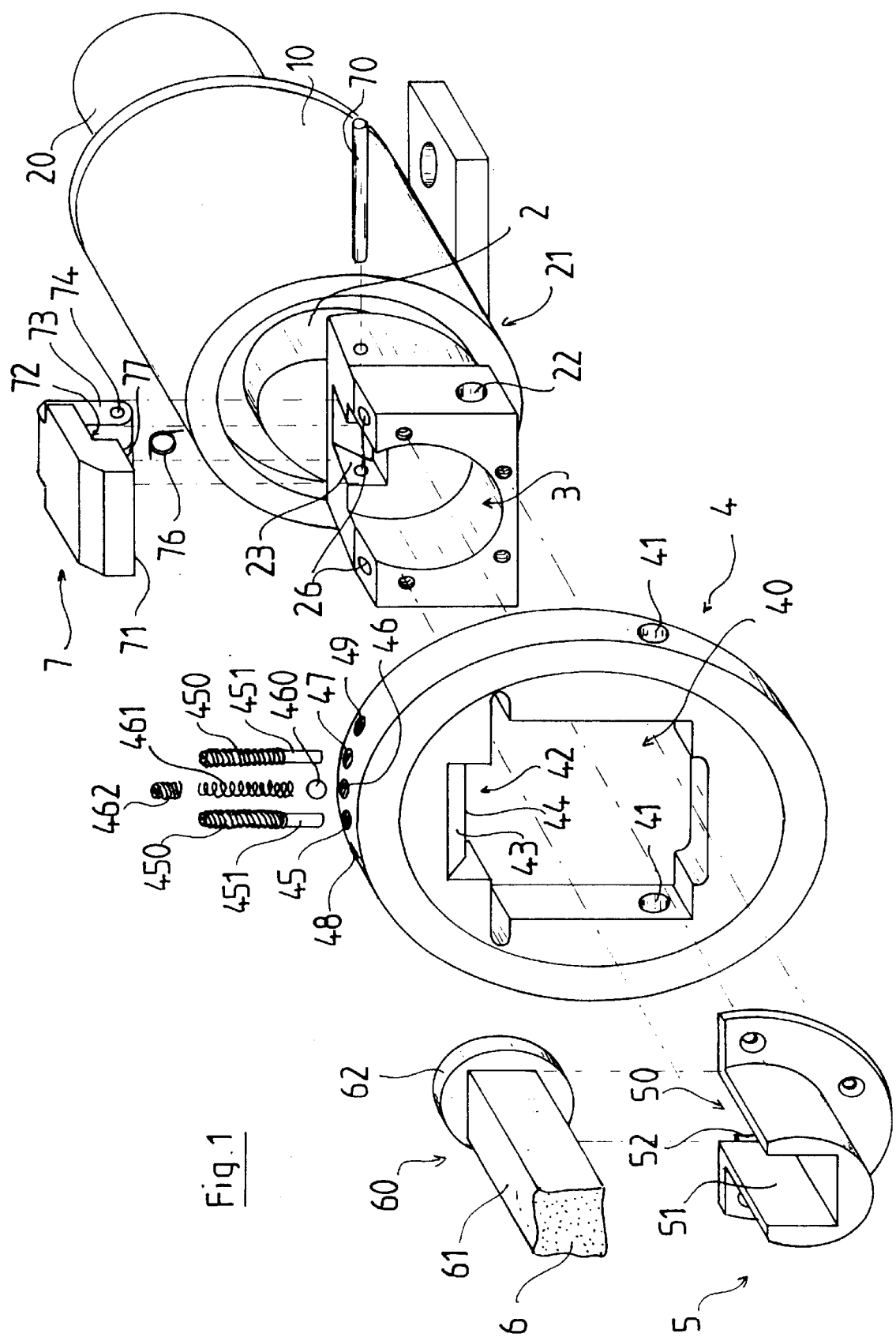
FIG. 1 represents a perspective, exploded view of a rocker bearing device according to the present invention.

If one refers to FIG. 1, one can see that a rocker bearing 1 according to the invention includes, in a known manner, a body 10 axially crossed by a drive spindle 2 of which the rear end 20 is designed to be linked to a motor means, not represented, and of which the front end 21 includes a seat 3.

A flywheel 4 is fixed by a known method, to the front end 21 of the drive spindle 2 which lodges itself in an opening 40 pierced in the flywheel 4, which can pivot towards the rear around two axes, not represented, passing through holes 41 pierced in the flywheel 4 and holes 22, of which only one is visible, pierced in the front end 21, on either side of the seat 3.

A wear piece 5 is introduced in the seat 3 which is of complementary form, and is fixed by a screw to the front end 21 of the drive spindle 2.

The wear piece 5 contains an cavity or recess 50 designed to receive the end 60 of a winding rod 6, which consists of two parts, i.e., a coupling lug 61 of a square cross-section and a disk 62 coaxial to the winding rod 6.

Figure 2:
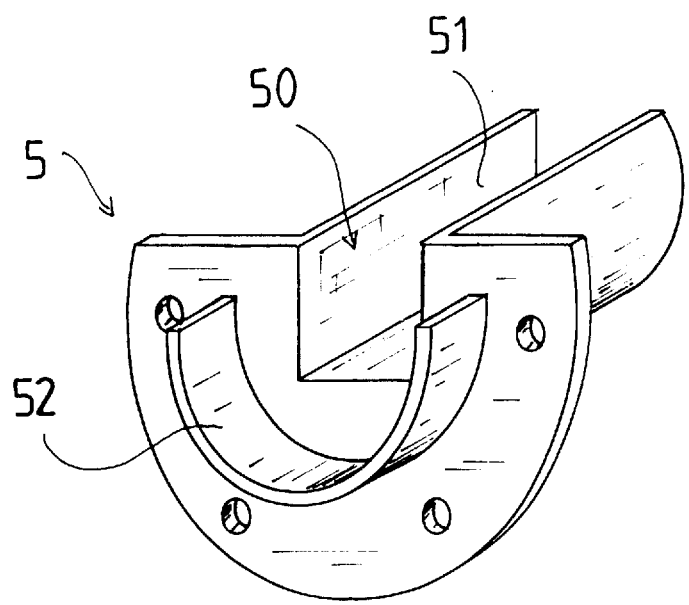
FIG. 2 represents a perspective view of a part of the same device.

As one can see more precisely in FIG. 2, the cavity or recess 50 of the wear piece 5 contains two parts, i.e., one part 51 of square section designed to receive the coupling lug 61, and a semi-circular part 52 designed to lodge a part of the disk 62.

The front part 21 of the axis 2 contains at the rear of the seat 3 a cap 23 in which a covering piece 7 may be linked around a transversal shaft 70, the covering piece 7 including a transversal part 71 designed to come into contact with the upper edge of the coupling lug 61 by passing above the disk 62, the upper part of which lodges in a transverse groove 72.

Figure 3:
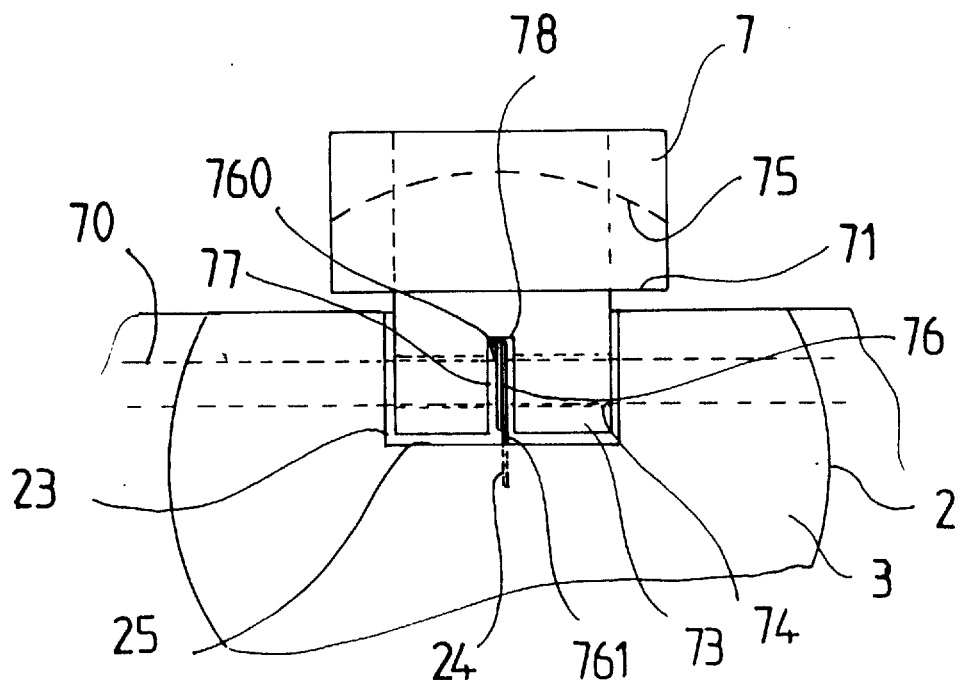
FIG. 3 represents an elevation of another part of the same device.

Referring also to FIG. 3, one can see that the pivoting of the covering piece 7 is carried out by means of a lever 73 pierced by a hole 74 for the passage of the shaft 70, and that the bottom 75 of the groove 72 is curved in order to join to the disk 62.

The piece 7 is brought back towards the rear by a spring 76 slid onto the shaft 70 and placed in a slit 77 of the lever 73, one end of which 760 leans against the bottom 78 of slit 77, while the other end 761 is introduced in the hole 24 vertically pierced in the bottom 25 of the opening 23.

The opening 40 pierced in the flywheel 4 contains a cut 42 of which the bottom consists of, in the front, an inclined section 43, and in the rear, a horizontal section 44. When the flywheel 4 is rocked towards the rear, the inclined section 43 permits, under the influence of the spring 76, disengagement towards the rear of the piece 7, and when the flywheel 4 is rocked towards the front, the horizontal section 44 positions the piece 7 on the end 60.

One can also see in FIG. 1 that the flywheel 4 is pierced in its upper region by three parallel bores 45, 46, 47, each comprising an upper screwed portion, and emerging in the horizontal section 44 of the opening 42.

The central bore 46 contains a ball 460 designed to come into contact with the piece 7 while being maintained by a spring 461 itself maintained by a screw 462, while the lateral bores 45 and 47 each contain a screw 450 equipped at its end with a bronze pin 451 designed to come into contact with the piece 7.

The pins 451 allow the adjustment of the position of the piece 7 when the flywheel 4 is rocked towards the closed front, while the ball 460 and the spring 461 act as a dampener to remedy an eventual clearance.

One can also see that the flywheel 4 includes two bores 48 and 49, positioned on both sides of the bores 45, 46, and 47, each containing, in a known manner, a ball, a spring and a tightening screw, not represented, in order to assure the indexing of the flywheel on the front part 21 of the axis 2 which contains at the upper region, for this purpose, two cavities 26 each designed to partially receive a ball.

The functioning of the bearing according to the invention is as follows: the flywheel 4 is rocked towards the rear and the end 60 of the winding rod 6 is put down in the cavity 50 of the wear piece 5, the lifted covering piece 7 not disturbing this maneuver. Then, the flywheel 4 is rocked towards the front folding back the piece 7 which passes over the disk 62 which gets stuck between the semi-circular cavity of the wear piece 5 and the curved bottom 75 of the piece 7.

What is claimed is:

1. A rocker bearing device designed to carry a coupling end of a winding rod, for the rolling and unrolling of a sheet of material comprising: a rotatable drive spindle, a flywheel pivotally disposed on a front end of the drive spindle, the coupling end of the winding rod laid in a housing of a wear piece, the coupling end of the winding rod provided with a coupling lug having a non-round section and at its end with a disk coaxial with the winding rod; the housing of the wear piece includes a drive part with a form complementary to that of the coupling lug and a semi-circular part for partially housing the disk; and a covering piece is fitted to the front end of the drive spindle while being mobile in rotation around a transversal shaft, and pulled back towards the rear by a spring which, at the time of the rocking towards the front of the flywheel, drags the covering piece to bring the covering piece into contact with the coupling lug by passing above the disk, the upper part of which closely lodges itself in a groove of the covering piece, the bottom of the groove being curved in order to join to the disk.

2. The device according to claim 1 wherein the flywheel has at least one threaded bore which opens in front of the covering piece when the flywheel is rocked towards the front, and in which is screwed a screw having a pin at its end designed to come into contact with the covering piece in order to assure the adjustment of the covering piece on the end of the winding rod by screwing of the screw.

3. The device according to claim 1 wherein the flywheel has a bore which opens in the front of the covering piece when the flywheel is rocked towards the front, and into which is introduced a ball designed to come into contact with the covering piece, while being maintained by a spring held by a screw screwed into the bore.

\* \* \* \* \*